United States Patent
Smith Dawkins et al.

(10) Patent No.: US 6,628,315 B1
(45) Date of Patent: Sep. 30, 2003

(54) SYSTEM, METHOD, AND PROGRAM FOR PROVIDING A BARRIER AROUND A MENU CHOICE TO REDUCE THE CHANCE OF A USER ACCIDENTALLY MAKING A SELECTION ERROR

(75) Inventors: Marilyn Diane Smith Dawkins, Austin, TX (US); Frank Eliot Levine, Austin, TX (US); Newton James Smith, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,585

(22) Filed: Dec. 17, 1999

(51) Int. Cl.[7] ................................................ G09G 5/00
(52) U.S. Cl. ................. 345/856; 345/862; 345/810
(58) Field of Search ........................ 345/856–862, 345/810, 157, 160, 163

(56) References Cited

U.S. PATENT DOCUMENTS

| | | | |
|---|---|---|---|
| 4,755,808 A | | 7/1988 | Bullock et al. |
| 5,508,717 A | | 4/1996 | Miller |
| 5,565,888 A | * | 10/1996 | Selker ........................ 345/157 |
| 5,673,068 A | | 9/1997 | Jondrow et al. |
| 5,757,358 A | * | 5/1998 | Osga ........................... 345/157 |
| 5,757,361 A | | 5/1998 | Hirshik |
| 5,805,165 A | * | 9/1998 | Thorne et al. .............. 345/823 |
| 5,808,601 A | | 9/1998 | Leah et al. |
| 5,825,308 A | | 10/1998 | Rosenberg |
| 5,963,191 A | * | 10/1999 | Jaaskelainen, Jr. .......... 345/856 |
| 5,986,639 A | * | 11/1999 | Ozawa et al. ............... 345/157 |
| 5,990,862 A | * | 11/1999 | Lewis ......................... 345/858 |
| 6,111,562 A | * | 8/2000 | Downs et al. .............. 345/727 |
| 6,295,049 B1 | * | 9/2001 | Minner ....................... 345/157 |
| 6,323,884 B1 | * | 11/2001 | Bird et al. .................. 345/810 |

OTHER PUBLICATIONS

Dictionary.Com (Definition of terms "Barrier" and "Border", pp. 1–7).*
Galitz (Essential Guide to User Interface Design, John Wiley & Sons, 1997, pp. 293–294).*
Netscape Browser, file menu, moving cursor from Print . . . to Close.

* cited by examiner

Primary Examiner—Sy D. Luu

(57) ABSTRACT

A system, method, and program of the invention reduces the chance of a user accidentally making a menu selection error, without causing the user extra effort in responding to a confirmation dialog. A menu layout is displayed in which a problem menu choice has a barrier around at least a part of its boundary. In one preferred embodiment, the barrier stops a pointer from entering the problem menu choice. A user must control the pointer through an opening in the barrier in order to move the pointer onto the problem menu choice. In another embodiment, the barrier does not impede the movement of a pointer crossing its boundary. Instead, as a pointer is moved across the boundary onto a problem menu choice, the problem menu choice becomes non-selectable. The problem menu choice becomes selectable again if the pointer is moved out of the problem menu choice and then back onto the problem menu choice through an opening in the boundary.

8 Claims, 7 Drawing Sheets

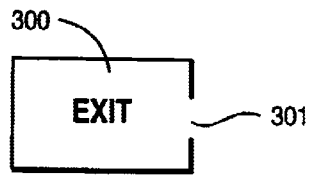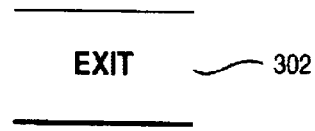
FIG. 3A  FIG. 3B
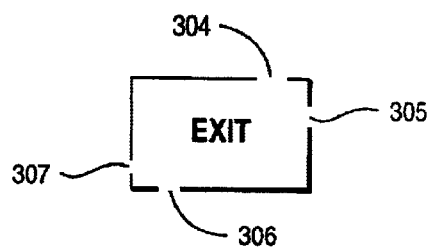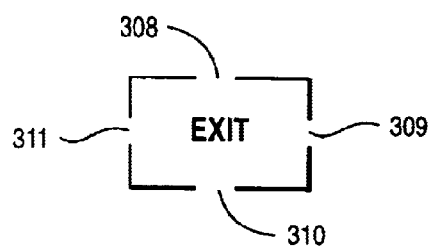
FIG. 3C  FIG. 3D
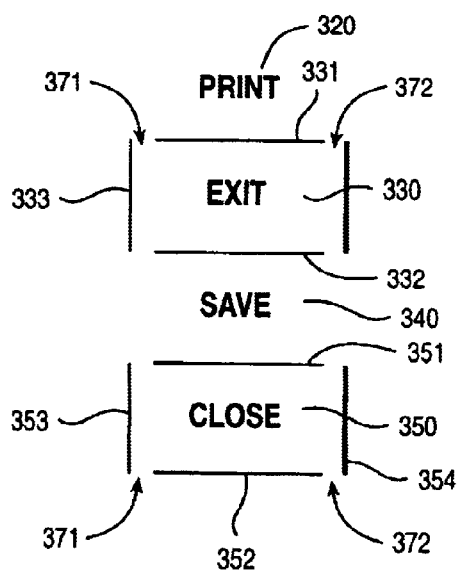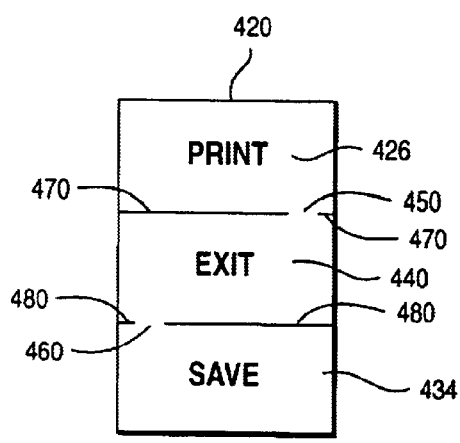
FIG. 3E  FIG. 4

USER PREFERENCE FILE

SPECIFY PROBLEM MENU CHOICES

FILE/CLOSE
    FILE/EXIT   — 601

DEFINE BARRIER — 602

○ VISUAL LINE
    ○ AREA
        THICKNESS _____

DEFINE OPENINGS — 603

○ NARROW
    ○ WIDE
    ○ TOP
    ○ BOTTOM
    ○ LEFT SIDE
    ○ RIGHT SIDE
    ○ OPPOSITE
    ○ OFFSET

DEFINE BARRIER TYPE — 604

○ STOP POINTER
    ○ DEACTIVATE SELECTABLE AREA

DEFINE BARRIER LOCATIONS — 605

○ TOP
    ○ BOTTOM
    ○ RIGHT SIDE
    ○ LEFT SIDE

FIG. 6

SYSTEM, METHOD, AND PROGRAM FOR PROVIDING A BARRIER AROUND A MENU CHOICE TO REDUCE THE CHANCE OF A USER ACCIDENTALLY MAKING A SELECTION ERROR

CROSS REFERENCE TO RELATED APPLICATION

"DISPLAYING MENU CHOICES ADJACENT TO SPATIALLY ISOLATING REGIONS ENABLING DIFFERENT CURSOR MOVEMENT SPEEDS AND OTHER NOTIFICATION MEANS", Ser. No. 09/465,583 having at least one common inventor, and commonly assigned, is hereby incorporated by reference.

BACKGROUND OF THE INVENTION

1. Field of the Invention

The field of invention relates to a method, system, and program means for reducing the chance of a user accidentally making a menu selection error, without causing the user extra effort in responding to a confirmation dialog; and, more specifically, to a user interface having a menu layout in which some of the menu choices have a barrier at least partially surrounding each of them.

2. Description of the Related Art

Considering that users rely on computers for a significant number of tasks performed every day, and that a variety of computers and computer software are used for these tasks; case of use has become an important factor in a user's computer usage efficiency. For example, pointing devices and displayed menu items in a user interface increase the case of use of computers and computer software and thus increase a user's computer usage efficiency.

Although the use of a pointing device allows a user to navigate through an application and its interface with convenience and speed, the ease with which the pointer can be moved often leads to errors when the user overshoots and clicks on the wrong menu choice. Menus often get constructed in a way that can lead a user into making serious errors. For example, an error might cause the user to inadvertently close a program. On the 'File' menu of a popular user interface, the 'Print' menu choice is directly above the 'Close' choice. If the user accidentally overshoots "Print" and clicks on 'Close' while attempting to print, the program terminates, and the program must be restarted. In addition, the user must repeat all of the steps in the program to get back to the point in the program prior to the occurrence of the error. These repeated steps can be burdensome and irritating to a user.

The user interface for Netscape has a visual line separating some menu choices from other menu choices. For example, under the "FILE" menu, there is a line between "Print" and "Close". There is also a visual line separating the "Go Offline" menu choice from the other surrounding menu choices. In addition, there is a line above and below the two "Save" menu choices which visually separate these menu choices from the surrounding menu choices. However, the line is merely a visual indicator that separates some menu choices from others. There is no other function associated with the line. The line does not inhibit a user from moving a pointer from one menu item to another or from moving the pointer freely throughout the menu list. The problem, however, is that a user can move a pointer so freely through a menu list that a user can overshoot a desired menu choice and inadvertently select a problem menu choice.

A current solution to this problem is to provide a confirmation dialog which requires a user to confirm the selection of a choice that may produce a highly undesirable result. Confirmation dialogs require extra effort on the part of the user, and are typically found to be undesirable by users.

A menu choice which has a potential of causing an undesirable effect if erroneously selected is referred to herein as a problem menu choice, a problem menu option, or problem menu selection.

SUMMARY OF THE INVENTION

An apparatus, method, and program product are provided for reducing the chance of a user accidentally making a menu selection error while moving a pointer through a list of menu choices without causing the user extra effort in responding to a confirmation dialog. A barrier is displayed around at least part of the boundary of a menu choice that is deemed to be a problem menu choice.

In one embodiment, the pointer can not be moved across the barrier. That is, the movement of the pointer is impeded at the barrier boundary. In one embodiment, the barrier stops the pointer when the pointer reaches the barrier. In another embodiment, the pointer jumps across the problem menu choice, i.e., instantaneously appears on the other side, when the pointer reaches the barrier associated with the problem menu choice. The barrier does not completely surround the problem menu choice. There is an opening, or break, in the barrier through which the pointer can be moved by a user using a pointing device if the user intentionally desires to select the problem menu choice. In this way, a pointer can be maneuvered around the barrier into a selectable area of a problem menu choice when so desired by a user, but its movement is impeded at the barrier of the problem menu choice if the user does not intend to make that selection and may have overshot another menu choice.

In another preferred embodiment, the pointer can pass through the barrier. However, if the pointer crosses the barrier, the problem menu choice becomes non-selectable. The problem menu choice becomes selectable when the pointer re-enters the problem menu choice through an opening in the barrier, or crosses the barrier on a different side of the problem menu choice, such as the opposite side, as the pointer re-enters the problem menu choice area. The problem menu choice may also become selectable after a triggering event, such as a second click on the pointing device or other input.

In such embodiments, the thickness of the barrier can be a single pixel (picture element), or a line of any width, or an area such as an area that creates an isolating region adjacent to a problem menu choice as described in copending patent application Ser. No. 09/465,583 which is herein incorporated by reference.

The foregoing and other objects, features and advantages of the invention will be apparent from the following more particular description of an example embodiment of the invention, as illustrated in the accompanying drawings, wherein like reference numbers represent like parts of the embodiment of the invention.

BRIEF DESCRIPTION OF THE DRAWINGS

For a more complete understanding of the present invention and the advantages thereof, reference should be made to the following Detailed Description taken in connection with the accompanying drawings in which:

FIGS. 3A, 3B, 3C, 3D and 3E illustrate different configurations of a barrier and the locations of the barrier openings;

FIG. 4 shows a displayed menu list having a barrier around at least part of the boundary of a problem menu choice;

FIG. 6 shows a dialog for creating a user preference file designating a problem menu choice and defining a barrier, the barrier openings, and the type of barrier.

DETAILED DESCRIPTION OF THE PREFERRED EMBODIMENTS

Figure 1:
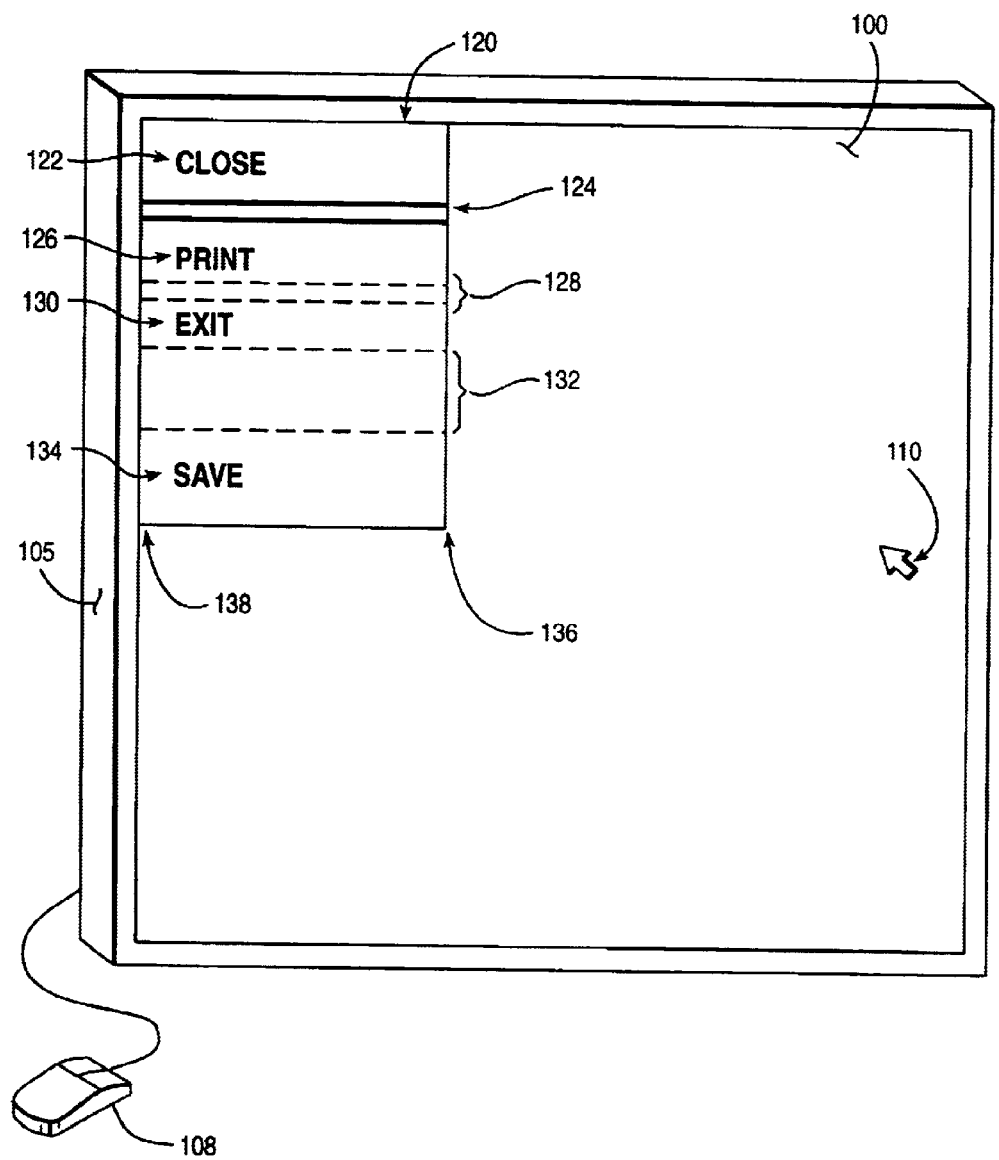
FIG. 1 illustrates a computer system displaying a menu list utilizing barriers around at least part of the boundaries of problem menu choices, and further illustrating different thickness of barriers used around problem menu choices in the displayed menu list.

Referring to FIG. 1, there is shown an example embodiment of the invention comprising a computer 105 having a display 100, pointer 110, and pointing device 108. The illustrated embodiment further comprises barriers 124, 128, and 132 inserted between selections 122 and 126, 126 and 130, and 130 and 134, respectfully. A barrier can have any thickness. For example, the thickness of the barrier can be a single pixel or more, thereby enabling the barrier to appear as a line as shown for barrier 124. The thickness of the barrier can comprise an area as shown for barrier 128, or as a separating non-selectable region as shown for barrier 132, as further described in copending application, Ser. No. 09/465,583, which is herein incorporated by reference. These barriers 124, 128, and 132 are examples of barriers used to prevent a user from inadvertently selecting a problem menu choice. As shown, the barriers 124, 128, and 132 extend from a first edge 138 to a second edge 136 of the menu 120. The barriers 124, 128, and 132 in FIG. 1 are shown for illustration purposes in describing a preferred embodiment of the invention. Other barrier designs could also be used.

The menu choices, such as "Close" and "Exit," (selectable areas 122 and 130 in FIG. 1 and 232 and 228 in FIG. 2, respectfully) are being used herein as problem menu choices for illustration purposes. These problem menu choices, if inadvertently selected, can cause a user to lose unsaved work, terminate a program inadvertently, or encounter a confirmation dialog. In addition, a user may have to restart a program and reiterate a sequence of selections or events to return back to the same place in the program prior to its inadvertent termination. Therefore, the present invention reduces the chance of, or prevents a user from, accidentally selecting a problem menu choice 122, 130, 228, and 232 when intending to make a different selection.

In one embodiment, as now described, the barrier is used to stop the pointer from moving into, or entering, the problem menu choice. The barrier 124 between menu selection "Close" 122 and "Print" 126 is located to prevent a user from overshooting the selectable area of "Print" 126 and accidentally selecting "Close" 122 by forcing the pointer 110 to remain in the selectable area of the menu 120, e.g., "Print" 126, that the pointer 110 enters into. Also, by forcing the user to move the pointer 110 onto the menu 120 at the desired selectable area, "Exit" 130, for instance, the user is required to make a more conscious effort in selecting "Exit" 130. This reduces the number of selections the user makes in error.

For example, a user may desire to select "Print" 126 in the menu 120. To accomplish this task, the user causes the menu 120 to display a full set of menu selections 122, 126, 130, and 134. The user then uses the pointing device 108 to move the pointer 110 onto the selectable area of "Print" 126. As the user moves the pointer 110 from the location of the pointer 110 illustrated, toward the selectable area of "Print" 126, the user's movement of the pointing device 108 may be sufficient to cause an unimpeded pointer 110 to overshoot "Print" 126 and come to rest on the selectable area of "Close" 122. However, when the pointer 110 reaches the barrier 124, moving in a direction toward "Close" 122, a problem menu choice in the present illustration, the pointer 110 is stopped while the pointer 110 still resides on the selectable area of "Print" 126. Thereby, the user cannot accidentally select "Close" 122, losing unsaved work, while intending to select "Print" 126. Furthermore, it should be noted that movement away from a problem menu selection 122 and 130, is unrestricted. That is, if the pointer encounters, or intersects with, a barrier associated with a problem menu choice as the pointer moves out of a problem menu choice, the pointer's movement will not be impeded or stopped.

Similarly, barrier 128 prevents an overshoot of "Print" 126 when the pointer is moved from the top of the menu 120 towards the bottom of the menu 120; and barrier 132 prevents an overshoot of "Save" 134 when the pointer is moved from the bottom of the menu 120 towards the top. As such, an accidental selection of "Exit" 130 does not occur.

Further, still referring to FIG. 1, the barrier 124 represents an aspect of the invention wherein a visible barrier is desirable, while alternative aspects of the invention are illustrated by the barriers 128 and 132. Unlike the solid black line used for barrier 124, barrier 128 is not visible to a user. Barrier 132 is only visible to the user in the sense that there is an increased spatial isolation between menu selections 130 "Exit" and 134 "Save". The effect of these barriers 128 and 132 is the same however, since the user must still enter the menu 120 at the desired selectable area and the pointer 110 stops when the pointer 110 reaches some position within the barriers 128 and 132. Barrier 132 is more fully discussed below in relation to another embodiment.

Figure 2:
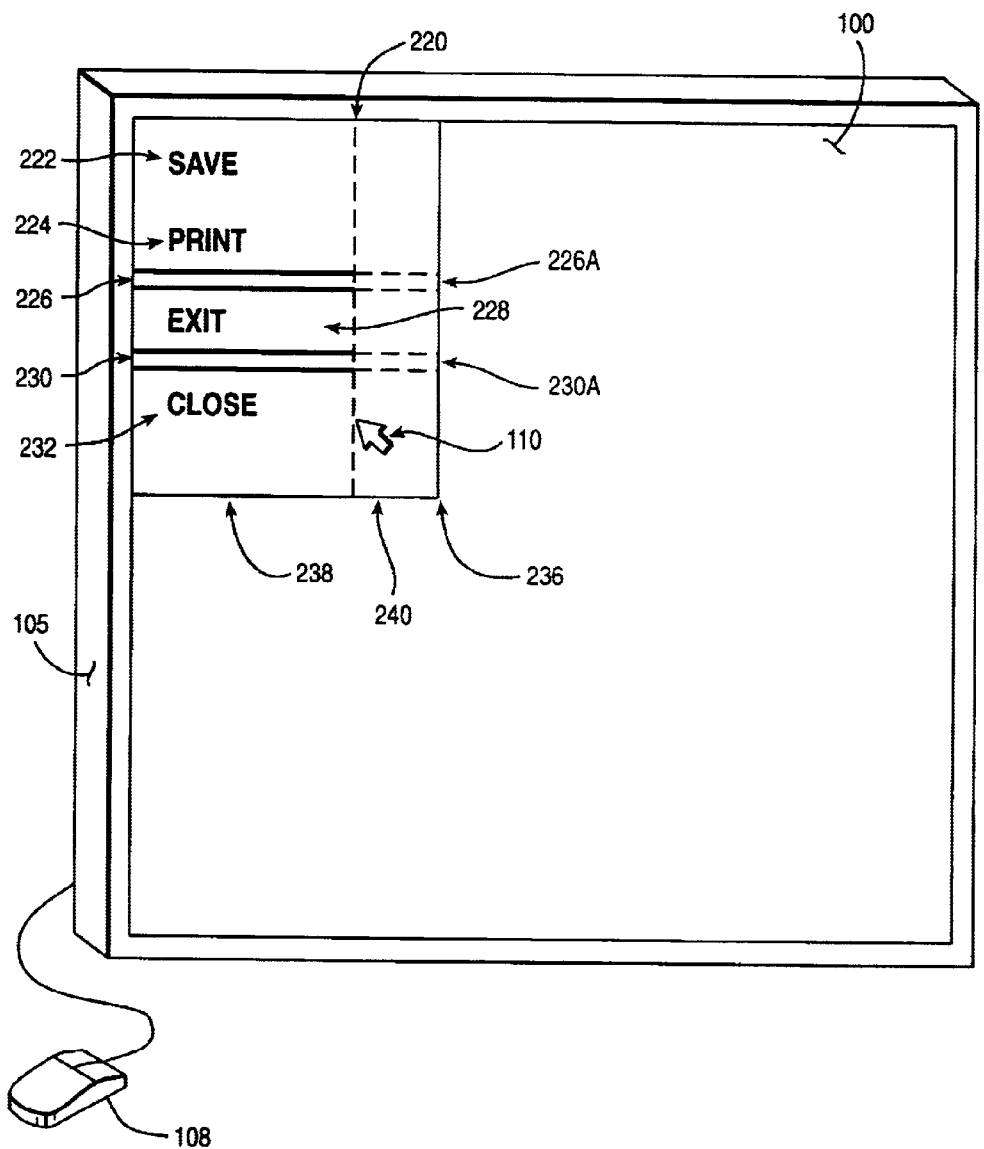
FIG. 2 illustrates barrier openings used in a preferred embodiment in which the menu disappears when the pointer moves off of the menu list.

As discussed above, the pointer 110 must move around the barriers 124, 128, and 132 by moving off the side 136 of the menu 120. For this embodiment, the menu 120 does not disappear when the pointer 110 moves off the side 136 of the menu 120. Referring now to FIG. 2, there is shown an alternative example embodiment of the invention comprising barriers 226 and 230 inserted between selections 224 and 228, and 228 and 232, respectfully. In the present example embodiment, the pointer 110 must remain on the menu 220 for the menu 220 to remain visible to the user. On a menu 220 that retracts when the pointer 110 does not remain on the menu 220, the present embodiment of the invention functions differently from the example embodiment above, yet still accomplishes the same goal. In the present embodiment of the invention, the inserted barriers 226 and 230 have openings 226A and 230A respectively. The openings 226A and 230A reside in an unselectable area 240 of the menu 220 and allow the cursor 110 to traverse the edge 236 of the menu 220. The user chooses a menu choice 222, 224, 228, or 232 by moving the pointer 110 into the selectable area 238 of the desired menu choice. For example, the user decides to choose "Exit" 228. In order to accomplish this task, the user moves the pointer 10, from the location illustrated, to a location within the unselectable area 240 and between openings 226A and 230A. Then, the user moves the pointer 110 into the selectable area 238 of "Exit" 228. If the user attempts to move the pointer into the selectable area 238 before passing through opening 230A, the pointer reaches barrier 230 at a point other than an opening 230A while moving in the direction of a problem menu choice 228 "Exit." Therefore, the pointer 110 stops. On the other hand, if the user moves the pointer 110 off the menu 220, the menu 220 does not remain visible to the user.

Thus, a "disappearing" menu list (i.e., a menu list that does not remain visible to a user when the pointer is moved off of the menu list) is enhanced to have a non-selectable area 240 along one or more edges of the menu list 220 in which to move a pointer unimpeded through the menu list. The non-selectable area 240 has the openings 226A, 230A to any of the barriers 226, 230. The user can consciously move the pointer through the openings in the barrier in the non-selectable area 240 to make any selection by moving the pointer into a selectable area 238 of a menu choice, e.g., by selecting "Exit" 228. As such, the present example embodiment enables the user to easily make an intentional selection of a problem menu choice while still reducing the chance of the user making an erroneous inadvertent selection.

It should be noted that the enhanced menu list having a non-selectable edge 240 containing the barrier openings can also be used in embodiments where the menu list remains visible even after the pointer moves off of it. Even if not specifically constructed in this way, the menu list 120 in FIG. 1 can be manipulated in a similar way. For example, a user can move the pointer up and down alongside the right side of the edge 136, which is a non-selectable area since it is not a part of the menu list. To make a menu choice, the user has to change the direction of the pointer, e.g., move it to the left, into a selectable area of a menu choice, which requires more of a conscious effort and can minimize the chance of the user inadvertently selecting a menu choice in error.

FIGS. 3A, 3B, 3C, 3D and 3E show various locations for the barrier opening(s) within a barrier associated with a problem menu choice. The barrier openings can be used with embodiments that have barriers that stop the pointer or with embodiments that deactivate the selectable area of the problem menu choice if the pointer crosses the barrier. FIG. 3A illustrates only one narrow opening 301 on one side of the problem menu choice. Other embodiments could place the one opening on any side of the problem menu choice. FIG. 3B illustrates a wider opening 302 on one or both sides of the problem menu choice. FIG. 3C illustrates narrower openings 304, 305, 306, 307 on each side of the problem menu choice where the openings are offset from the other opening on the opposite side. FIG. 3D illustrates narrower openings 308, 309, 310, 311 on each side of the problem menu choice where the openings are directly opposite each other. In the menu shown in FIG. 3E, the barriers 331, 332, 333, and 334 are associated with problem menu choice "Exit" 330, and barriers 351, 352, 353, 354 are associated with problem menu choice 350. There are non-selectable areas 371 and 372 which allow a pointer to move up and down throughout the menu. To make a selection, the pointer is moved horizontally into a selectable area of a menu choice. Other configurations of menus, barriers, and barrier openings, are also possible.

Figure 5A:
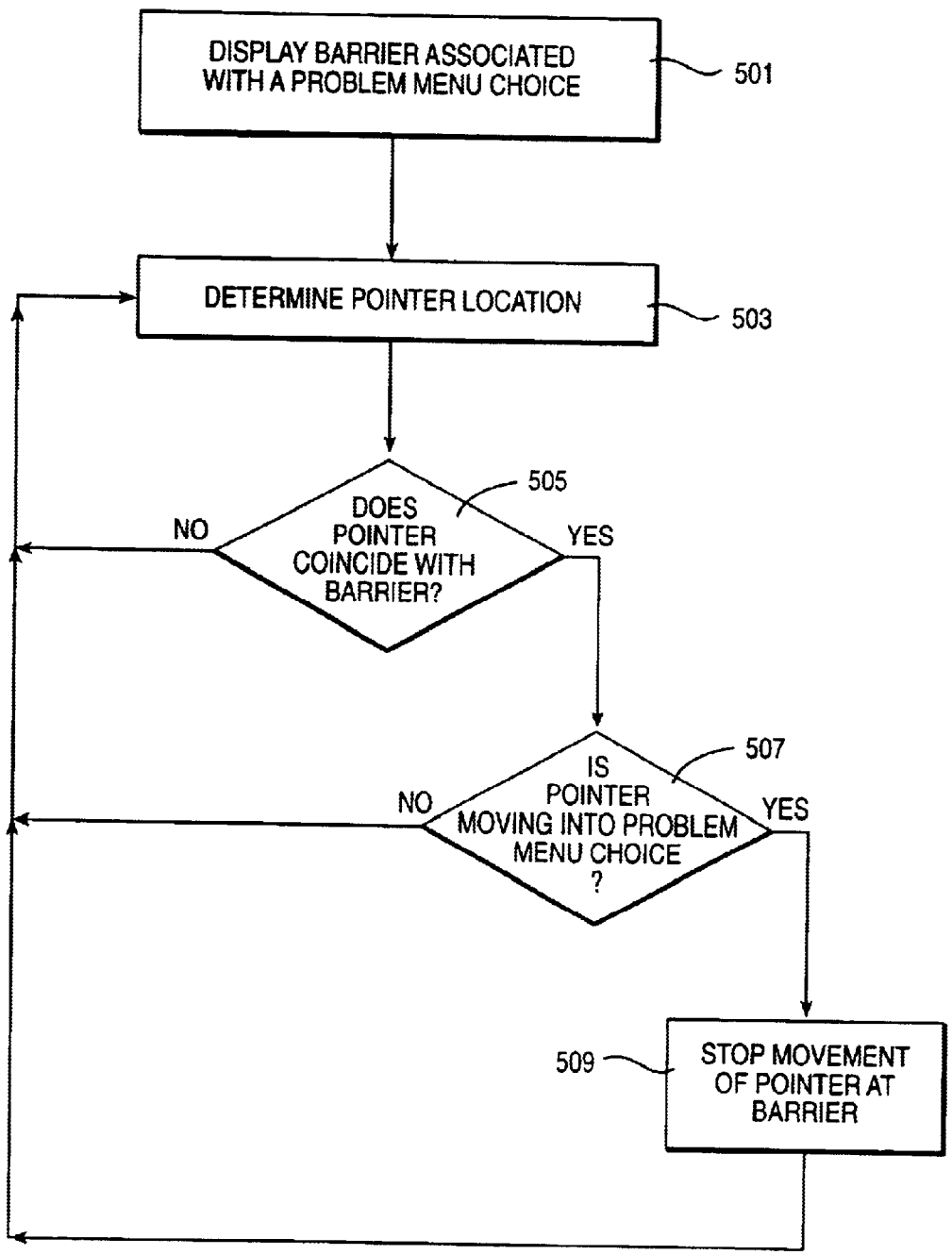
FIG. 5A is a diagram illustrating the method, means, and program function to effectuate a barrier around at least part of a boundary of a problem menu choice that inhibits, or stops, a pointer from moving into the problem menu choice.

As shown in FIG. 5A, the process, apparatus, and article of manufacture of the invention provide a method, means, and program function to effectuate a barrier around at least part of a boundary of a problem menu choice that inhibits, or stops, a pointer from moving into the problem menu choice. A barrier is displayed associated with a problem menu choice, 501. The pointer location is determined, 503. It is determined whether the pointer location coincides with a barrier location, 505. If it does not, the control returns to determining the pointer location 503. If it does coincide, it is determined whether the pointer is moving towards the problem menu choice, 507. If it is determined that the pointer was subsequently inside the problem choice, or is in the process of leaving the problem menu choice, control returns to determining the pointer location, 503. If it is determined that the pointer was subsequently outside of the problem menu choice, or is in the process of moving into the problem menu choice, the movement of the pointer is stopped from going into the problem menu choice, 509. Alternatively, instead of stopping the pointer at the barrier, the pointer could jump over the problem menu choice. The pointer, however, would not be able to land in another problem menu choice. Control returns to determining the pointer location, 503.

In another preferred embodiment of the invention, the barrier does not stop the pointer from entering into the problem menu choice. Instead, once the pointer hits, or crosses, the barrier associated with a problem menu choice, the problem menu choice no longer becomes selectable. This allows the pointer to be moved freely throughout a menu 120 without obstruction, while still preventing a problem menu choice from being inadvertently selected. In a preferred embodiment, the problem menu choice becomes selectable when the pointer re-enters the problem menu choice through a barrier opening. Other embodiments reactivate the selectable area after a triggering event, such as a second click on the pointing device, or other input event.

FIG. 4 illustrates a preferred embodiment in which the barrier deactivates the selectable area of the problem menu choice when the pointer crosses it, and reactivates the selectable area when the pointer re-enters through an opening in the barrier, such as on the opposite side (although it could be on the same side). Menu 420 has menu choice "Print" 426, problem menu choice "Exit" 440, and menu choice "Save" 434. As the pointer moves from "Save" 434 at the lower part of the menu up towards "Print" 426, the pointer crosses barrier 480. As the pointer intersects with the barrier 480, even if it intersects at opening 460, the problem menu choice "Exit" 440 becomes non-selectable. In this way, if the user overshot "Save" 434, the user cannot inadvertently select the problem menu choice "Exit" 440. The pointer can continue to be moved through the problem menu choice 440 and towards "Print" 426. If the user intends to select "Exit" 440, the user must either i) move the pointer back down across barrier 480 and re-enter the problem menu choice 440 through opening 460, or ii) move the pointer through the menu choice, past barrier 470, and then bring the pointer back down and re-enter the menu choice "Exit" 440 through opening 450. Once a barrier is crossed going into the problem menu choice, the problem menu choice remains non-selectable until the pointer re-enters the problem menu choice through a barrier opening, or until another menu choice is selected, or until the menu 420 is closed.

Likewise, as the pointer moves from "Print" 426 at the top part of the menu down towards "Save" 434, the pointer crosses barrier 470. As the pointer intersects with the barrier 470, even if it intersects at opening 450, the problem menu choice "Exit" 440 becomes non-selectable. In this way, if the user overshot "Print" 426, the user cannot inadvertently select the problem menu choice "Exit" 440. The pointer can continue to be moved through the problem menu choice 440 down towards "Save" 434. If the user intends to select "Exit" 440, the user must move the pointer through the menu choice 440, past barrier 480 or 470 and then bring the pointer back into the menu choice "Exit" 440 through an opening 460 or 450.

Figure 5B:
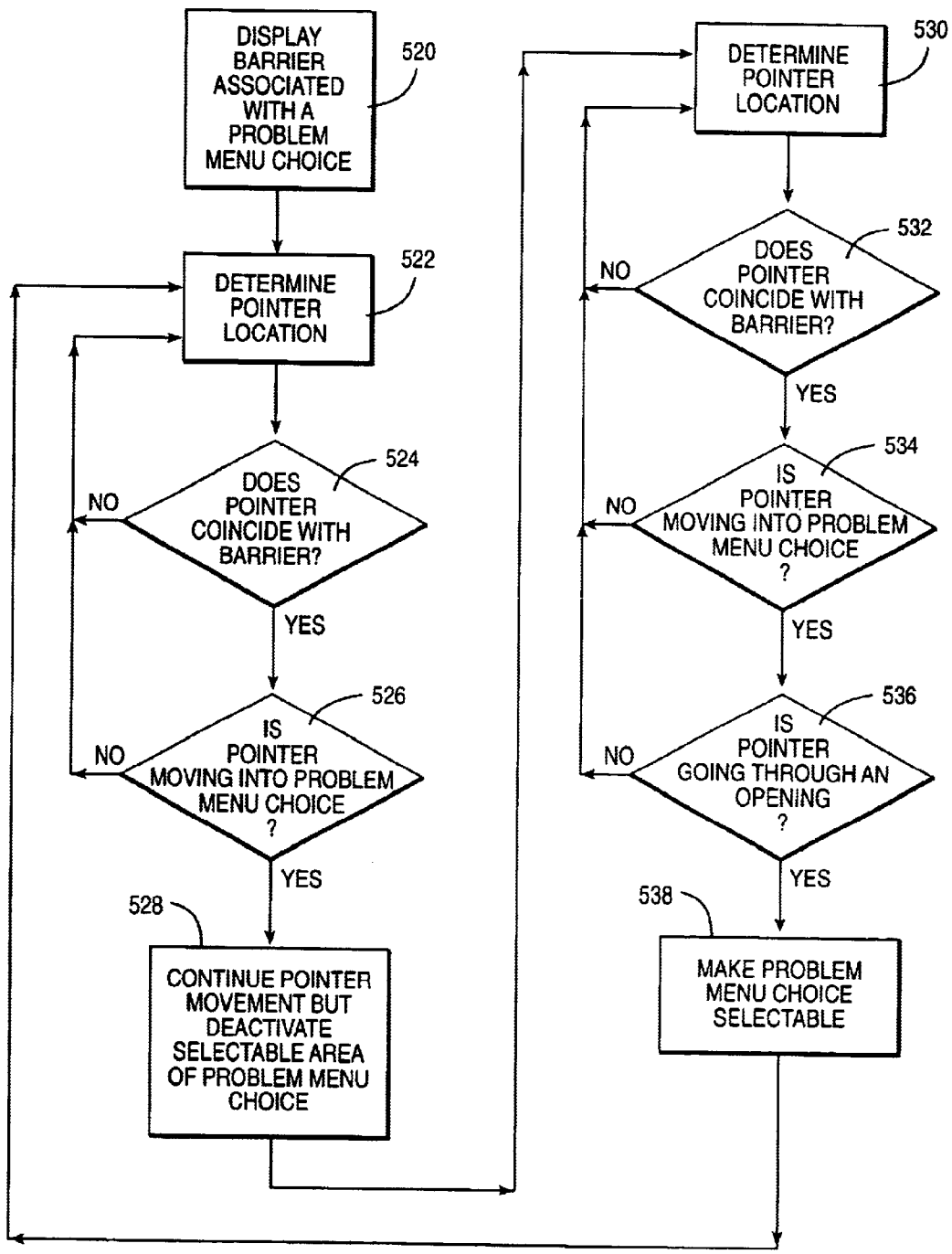
FIG. 5B is a diagram illustrating the method, means, and program function to effectuate a barrier around at least part of a boundary of a problem menu choice that deactivates the selectable area of the problem menu choice when the pointer intersects with the barrier as it moves towards the problem menu choice.

As shown in FIG. 5B, the process, apparatus, and article of manufacture of the invention provide a method, means, and program function to effectuate a barrier around at least part of a boundary of a problem menu choice that deactivates the selectable area of the problem menu choice when the pointer intersects with the barrier as it moves towards the problem menu choice. A barrier is displayed associated with a problem menu choice, 520. The pointer location is determined, 522. It is determined whether the pointer location coincides with a barrier location, 524. If it does not, the control returns to determining the pointer location 522. If it does coincide, it is determined whether the pointer is moving towards the problem menu choice, 526. If it is determined that the pointer was subsequently inside the problem choice, i.e., it is in the process of leaving the problem menu choice, control returns to determining the pointer location, 522. If it is determined that the pointer was subsequently outside of the problem menu choice, i.e., it is in the process of moving into the problem menu choice, the movement of the pointer continues into the problem menu choice, but the selectable area of the problem menu choice becomes non-selectable, 528. The pointer location continues to be determined, 530. Again it is determined whether the pointer location coincides with a barrier location, 532. If it does not, control returns to determining the pointer location, 530. If it does coincide, it is determined whether the pointer is moving towards the problem menu choice, 534. If it is determined that the pointer was subsequently inside the problem choice, i.e., it is in the process of leaving the problem menu choice, control returns to determining the pointer location, 530. If it is determined that the pointer was subsequently outside of the problem menu choice, i.e., it is in the process of moving into the problem menu choice, the problem menu choice becomes selectable, 538. Control returns to determining the pointer location, 522.

It should be noted that in the preferred embodiments the barrier is associated with a specific problem menu choice. The barrier only causes an effect, either stopping the pointer or deactivating the selectable area of the problem menu choice, when a pointer is moving towards, or into, the problem menu choice. The barrier causes no effect as the pointer moves from the area within the problem menu choice, across the barrier, and away from the problem menu choice.

Barrier 132 in FIG. 1, is shown as a spatial isolating (or separating) region separating a problem menu choice "Exit" 130, from another menu choice "Save" 134. This type of barrier is more fully described in copending patent application Ser. No. 09/465,583 which is herein incorporated by reference.

As disclosed in Ser, No. 09/465,583, a separating region is displayed adjacent to certain menu choices which have a potential of causing undesirable results if erroneously selected by the user, i.e., problem menu choices. The displayed region is a non-selectable area. That is, even though it is visually associated with the problem menu choice, the problem menu choice is not enabled to be selected when the displayed cursor is within the region. As such, the region spatially isolates the problem menu choice from other menu choices.

In some preferred embodiments, the region surrounds the problem menu choice on all sides of the problem menu choice. In other embodiments, the separating region is displayed on just one or more of the sides of the problem menu choice, such as above the problem menu choice, or below it, or to one or more sides of it. The positioning of the separating region takes into consideration the direction that a displayed pointer is typically moved across the list of menu choices, and whether or not other menu choices are positioned above, below, or next to the problem menu choice. For example, a problem menu choice at the bottom of a list of menu choices may have a separating region above the problem menu choice, but not below the problem menu choice.

In addition to displaying a separating region adjacent to a problem menu choice, the preferred embodiments of the invention provide a method and means for notifying the user upon movement of the displayed pointer, i.e., cursor, into the separating region. As such, if the user did indeed overshoot a menu choice, any such notification serves also as a notification of an overshoot of a desired menu choice or selectable area. For different embodiments, the notification may include at least one of the following method or means: i) causing the displayed pointer to have a change in its appearance, such as by causing it to blink or change colors; ii) causing an audio indication such as a beep or a tone as the displayed pointer moves into the separating region; and iii) causing the displayed pointer, controlled by a pointing device, to have a change in its rate of movement, as it enters into a separating region, relative to the movement of the pointing device. In other embodiments, the rate of movement of the displayed pointer is dependent upon the distance the displayed pointer is from a selectable area of the problem menu choice, or dependent upon the positioning of the displayed pointer within zones that have been sectioned off within the separating region.

For example, if it is determined that the location of the displayed pointer is within a separating region or on its boundary, the displayed pointer slows down as it is moved through the separating region. The slowing of the displayed pointer indicates to the user that the displayed pointer is moving towards a problem menu choice, and that the user may have overshot a previous menu choice. More specifically, the slowing of the displayed pointer through a non-selectable separating region gives the user time to notice the location and direction of the displayed pointer and to assess whether or not the user has overshot a previous menu choice.

In a preferred embodiment, the displayed pointer returns to its normal or original speed when the displayed pointer has passed through the separating region. In other embodiments, once the displayed pointer has slowed down and passed through a separating region adjacent to a problem menu, the displayed pointer may increase in speed as it moves within the boundary of a problem choice menu. In this way, a user is required to use finer control over a pointing device in controlling a displayed pointer to be positioned over a selectable region of a menu choice, which requires more attention from the user in controlling the pointing device; thereby minimizing a chance of inadvertently selecting an undesirable menu choice. Increasing the speed of the displayed pointer through the problem menu choice makes it easier for the user to overshoot the problem menu choice. This makes it more difficult for the user to inadvertently select the problem menu choice. As such, the problem choice menu can only be easily selected if the user takes added care in controlling the pointing device through a slower movement and finer control of the pointing device when intentionally selecting the problem menu choice.

The above embodiment has been described in terms of the changes in the rate of movement of the displayed pointer within a separating region and through menu choices. Other embodiments are comprised of methods, means and program functions for sounding a tone as the displayed pointer enters into a separating region. The tone may increase or decrease in volume or pitch as it moves through a separating region or its zones. Likewise, other embodiments may use discrete tones (beeps) that increase or decrease in frequency as the displayed pointer moves through a separating region, through its zones, or through menu choices. In addition, other embodiments may use other notification methods, means, and program functions such as causing the displayed pointer to blink at various rates as the displayed pointer is moved through a separating region, its zones, or through menu choices. Enabling the displayed pointer to blink at various rates or frequencies, or enabling an audible tone at various volumes, pitches, or frequencies is carried out in a fashion similar to enabling the displayed pointer to move at different rates as more thoroughly described above.

The embodiments of the invention described herein can also include yet another feature to further inhibit a user from inadvertently selecting a problem menu choice. This further feature enables the problem menu choice to ignore a first "click" by a user. That is, if a user overshoots a desired menu choice, passes through the separating region, and still enters into the selectable area of the problem menu choice, the user must select, or click on, the problem menu choice two times. The first time will be ignored by the computer system. This feature can be used alone or in conjunction with any one or more of the notification means that may be used when the displayed pointer enters into the separating region. It is deemed to be particularly advantageous to use this feature in an embodiment in which an audible tone is produced to notify the user that the displayed pointer has entered into a separating region. Then, if the user overshoots the separating region, the chance that the user will inadvertently select the problem menu choice is reduced because the user's first click, or selection, is ignored.

The separating region 132 of FIG. 1 can be used as a barrier in which the pointer is stopped at the edge of the separating region adjacent to the problem menu choice, or stopped somewhere within the separating region. Prior to stopping, the pointer may slow down through the separating region, change appearance, generate an audible sound or generate some other notification that the pointer is approaching a problem menu choice, as described above. A preferred embodiment, however, implements the separating region barrier in conjunction with allowing the pointer to continue into the problem menu choice while deactivating the selectable area of the problem menu choice. The pointer may then return to its normal rate, if it slowed down through the separating region, or increase its rate of movement through the now non-selectable problem menu choice. In order for a user to intentionally select the problem menu choice, the user moves the pointer through a barrier opening back into the problem menu choice which will reactivate the selectability of the problem menu choice. The selectability may also be reactivated upon a triggering event, such as a second click of a pointing device. That is, the problem menu choice could not be selected if a user does a single click in the problem choice area after passing through a barrier boundary, but the problem choice area would become selectable upon a second click or other triggering event.

The above features of the invention, such as which menu choices are deemed to be problem menu choices, the effect of a barrier (i.e., either to stop the pointer or to cause the problem menu choice to become non-selectable), and the location and size of the barrier openings, can be specified by a user of a program or the program's designer. These features can be "fixed" within the user interface of a software program, or they can be user selectable. More specifically, the features can be designed into any software program displaying a menu at the time the software program is created, or a user customization function can be provided, such as a user preference file, that allows a user to specify these features.

FIG. 6 shows a dialog box 600 for creating a user preference file that allows a user to designate which menu choices are deemed by the user to be problem menu choices 601. The user preference file also allows a user to define the barrier 602, the barrier openings 603 and to specify the type of barrier 604, i.e., whether the barrier will stop the pointer, or cause the problem menu choice to be non-selectable.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. Examples of computer usable mediums include, but are not limited to: nonvolatile, hard-coded type mediums such as CD-ROMs, DVDs, read only memories (ROMs) or erasable, electrically programmable read only memories (EEPROMs), recordable type mediums such as floppy disks, hard disk drives and CD-RW and DVD-RW disks, and transmission type mediums such as digital and analog communication links, or any signal bearing media.

The foregoing description of the preferred embodiments of the invention has been presented for the purposes of illustration and description. It is not intended to be exhaustive or to limit the invention to the precise form disclosed. Many modification and variations are possible in light of the above teaching.

Figure 7:
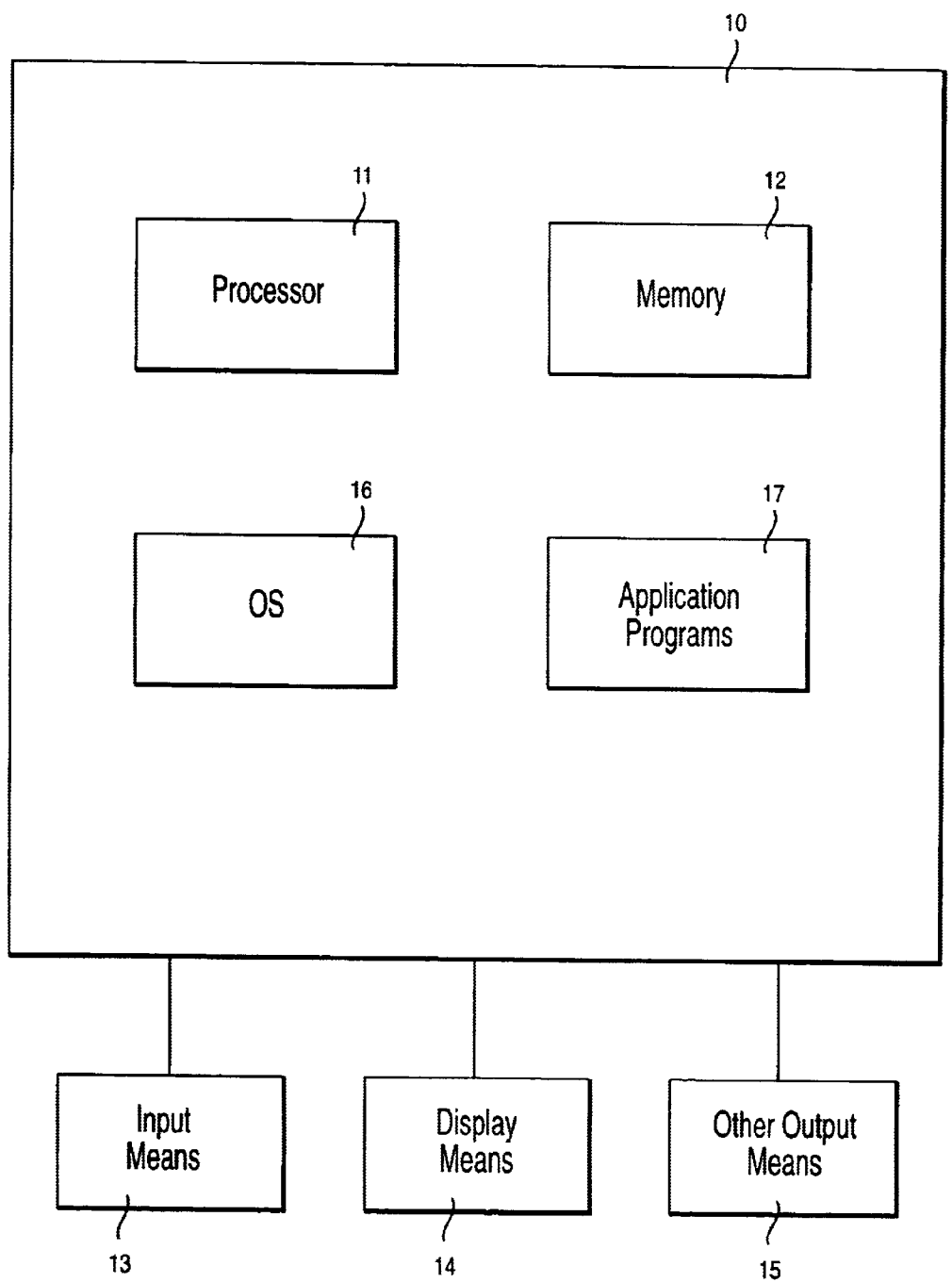
FIG. 7 illustrates a computer system for carrying out the embodiments of the invention.

FIG. 7 depicts a block diagram of a typical computer system in which the described embodiments of the invention may be utilized. The computer includes at least one processor 11 and memory 12. The computer may be, but is not limited to, a personal computer, laptop, workstation, mainframe or hand held computer including palmtops, personal digital assistants, smart phones, cellular phones, etc. The computer system includes input means 13 such as keyboard, mouse, track ball, light pen, pen-stylus, voice input system, touch sensitive device, and/or any other input means. Also included are display means 14 and/or any other output device 15 including network communication devices. Memory 12 includes volatile or nonvolatile storage and/or any combination thereof. Volatile memory may be any suitable volatile memory device, e.g., RAM, DRAM, SRAM, etc. Nonvolatile memory may include storage space, e.g., via the use of hard disk drives, tapes, etc., for data, databases, and programs. The programs in memory include an operating system 16 and application programs 17.

The exemplary embodiment shown in FIG. 7 is provided solely for the purposes of explaining the preferred embodiments of the invention; and those skilled in the art will recognize that numerous variations are possible, both in form and function. For instance, any one or more of the following—the processor and/or memory and/or the input/output devices—could be resident on separate systems such as in a network environment.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

What is claimed is:

1. A method for providing a user interface to a software program on a computer, the method comprising:

displaying a barrier adjacent to a problem menu choice on the display;

enabling a pointer to enter the problem choice menu through an opening in the barrier; and stopping the pointer from entering the problem menu choice when the pointer reaches said displayed barrier.

2. A method for providing a user interface to a software program on a computer, the method comprising:

displaying a barrier adjacent to a problem menu choice on the display;

deactivating the problem menu choice from being selectable when a pointer crosses said displayed barrier; and reactivating the problem menu choice to be selectable if the pointer re-enters the problem choice menu through an opening in the barrier.

3. A method for providing a user interface to a software program on a computer, the method comprising:

displaying a barrier adjacent to a problem menu choice on the display;

determining a location of a pointer on the display;

determining if the pointer is outside the problem menu choice and moving toward the problem menu choice;

deactivating the problem menu choice from being selected when the pointer crosses said displayed barrier if it is determined that the pointer was subsequently outside of the problem menu choice and is moving towards the problem menu choice;

reactivating the problem menu choice to be selectable if it is determined that a pointer is re-entering the problem menu choice through an opening in the barrier.

4. A computer communicatively connected to a display and input means, comprising:

means for displaying a barrier adjacent to a problem menu choice on the display;

means for enabling a pointer to enter the problem choice menu through an opening in the barrier; and means stopping the pointer from entering the problem menu choice when the pointer reaches said displayed barrier.

5. A computer communicatively connected to a display and input means, comprising:

means for displaying a barrier adjacent to a problem menu choice on the display;

means for causing the problem menu choice to become non-selectable when a pointer crosses said displayed barrier; and means for reactivating the problem menu choice to be selectable if the pointer re-enters the problem choice menu through an opening in the barrier.

6. A computer communicatively connected to a display and input means, comprising:

means for displaying a barrier adjacent to a problem menu choice on the display;

means for determining a location of a pointer on the display;

means for determining if the pointer is outside the problem menu choice and moving toward the problem menu choice;

means for deactivating the problem menu choice from using selectable when the pointer crosses said displayed barrier if it is determined that the pointer was subsequently outside of the problem menu choice and is moving towards the problem menu choice;

means for reactivating the problem menu choice to be selectable if it is determined that a pointer is re-entering the problem menu choice through an opening in the barrier.

7. A computer program on a computer usable medium having computer readable program code means, comprising:

means for displaying a barrier adjacent to a problem menu choice on the display;

means for enabling a pointer to enter the problem choice menu through an opening in the barrier; and means stopping the pointer from entering the problem menu choice when the pointer reaches said displayed barrier.

8. A computer program on a computer usable medium having computer readable program code means, comprising:

means for displaying a barrier adjacent to a problem menu choice on the display;

means for causing the problem menu choice to become non-selectable when a pointer crosses said displayed barrier; and means for reactivating the problem menu choice to be selectable if the pointer re-enters the problem choice menu through an opening in the barrier.

* * * * *